United States Patent
Welker (10) Patent No.: US 9,481,607 B2
(45) Date of Patent: Nov. 1, 2016

(54) SYSTEM, METHOD AND APPARATUS FOR MANUFACTURING STABLE CEMENT SLURRY FOR DOWNHOLE INJECTION

(71) Applicant: MACH IV, LLC, Dallas, TX (US)

(72) Inventor: Charles D. Welker, Dallas, TX (US)

(73) Assignee: Mach IV, LLC, Dallas, TX (US)

( * ) Notice: Subject to any disclaimer, the term of this patent is extended or adjusted under 35 U.S.C. 154(b) by 676 days.

(21) Appl. No.: 13/776,408

(22) Filed: Feb. 25, 2013

(65) Prior Publication Data

US 2014/0238665 A1     Aug. 28, 2014

Related U.S. Application Data

(63) Continuation of application No. PCT/US2013/021780, filed on Jan. 16, 2013.

(60) Provisional application No. 61/587,481, filed on Jan. 17, 2012.

(51) Int. Cl.
| | |
|---|---|
| C04B 38/10 | (2006.01) |
| E21B 33/138 | (2006.01) |
| E21B 21/14 | (2006.01) |
| C04B 28/02 | (2006.01) |
| C09K 8/473 | (2006.01) |
| E21B 33/14 | (2006.01) |
| C04B 103/40 | (2006.01) |

(52) U.S. Cl.
CPC ............. *C04B 38/103* (2013.01); *C04B 28/02* (2013.01); *C09K 8/473* (2013.01); *E21B 21/14* (2013.01); *E21B 33/138* (2013.01); *E21B 33/14* (2013.01); *C04B 2103/406* (2013.01)

(58) Field of Classification Search
CPC ..... C04B 38/10; C04B 38/103; E21B 33/00; E21B 33/13; E21B 33/14
See application file for complete search history.

(56) References Cited

U.S. PATENT DOCUMENTS

| | | |
|---|---|---|
| 5,806,594 A | 9/1998 | Stiles et al. |
| 6,457,524 B1 | 10/2002 | Roddy |
| 7,013,975 B2 | 3/2006 | Chatterji et al. |
| 2010/0246312 A1 | 9/2010 | Welker |

FOREIGN PATENT DOCUMENTS

GB    2004-080917 A1    9/2004

OTHER PUBLICATIONS

PCT: International Search Report and Written Opinion of PCT/US2013/021780 (counterpart application); Apr. 30, 2013; 14 pages.

*Primary Examiner* — Yong-Suk (Philip) Ro
(74) *Attorney, Agent, or Firm* — Neal G. Massand (57) ABSTRACT

A method for manufacturing stable lightweight cement slurry in a continuous manner for downhole injection comprising the steps of manufacturing a foamed gas having desired density ranging from about 2.15 to about 2.35 lb/cubic ft. and utilizing foam stabilizing nonionic surfactant. And, an apparatus for carrying out the method.

15 Claims, 6 Drawing Sheets

SYSTEM, METHOD AND APPARATUS FOR MANUFACTURING STABLE CEMENT SLURRY FOR DOWNHOLE INJECTION

CROSS-REFERENCE TO RELATED APPLICATIONS

This U.S. Utility Application is a continuation application, claiming priority pursuant to 35 U.S.C. §365(c) to the Patent Cooperation Treaty Application, Ser. No. PCT/US2013/21780 titled, "SYSTEM, METHOD AND APPARATUS FOR MANUFACTURING STABLE CEMENT SLURRY FOR DOWNHOLE INJECTION," the specification of which is incorporated herein by reference for all purposes, and which claims priority to the U.S. Provisional Application Ser. No. 61/514,638, titled "COMPOSITION AND METHOD FOR ENTRAINING AIR IN CEMENT SLURRY FOR DOWNHOLE INJECTION," filed Jan. 17, 2012, the specification of which is incorporated herein by reference for all purposes.

This application is also related to U.S. patent application Ser. No. 12/748,883, filed on Mar. 29, 2010, entitled "SYSTEM, METHOD AND APPARATUS FOR ENTRAINING AIR IN CONCRETE," published on Sep. 30, 2010 under publication No. US 2010/0246312, the specification of which is incorporated herein by reference for all purposes, and which is a continuation-in-part of U.S. patent application Ser. No. 11/709,932, filed on Feb. 21, 2007, entitled "METHOD AND APPARATUS FOR MAKING AIR-ENTRAINED OR CELLULAR HIGH-STRENGTH CONCRETE," published on Feb. 7, 2008 under publication No. US 2008/0028988, the specification of which is incorporated herein by reference for all purposes. U.S. patent application Ser. No. 11/709,932 claims the benefit of U.S. Provisional Application for Patent Ser. No. 60/775,571, filed on Feb. 21, 2006, and entitled "METHOD AND APPARATUS FOR MAKING AIR-ENTRAINED OR CELLULAR HIGH-STRENGTH CONCRETE," the specification of which is incorporated herein by reference for all purposes.

TECHNICAL FIELD

The present invention relates, generally, to system, method and apparatus for producing stable, foamed cement slurry for a downhole cementing. In particular, a system, method and apparatus for well bore cementing is disclosed utilizing foam stabilizing surfactant to continuously incorporate air in cement as the wet-slurry of cement is prepared for a case cementing in a downhole injection.

BACKGROUND OF THE INVENTION

Part of the completion process of a prospective oil or gas production well involves cementing the annulus, e.g. the annular space between the well casing and the well bore after a casing string has been run in a wellbore in order to permanently seal the bore and prevent any fluid or gas penetration into the well. Additionally, cementing may be used to seal a lost circulation zone, or an area where there is a reduction or absence of flow within the well. In directional drilling, cementing is used to plug an existing well, in order to run a directional well from that point. Also, cementing is used to plug a well when the well is abandoned. The process of downhole cementing further includes conductor casing and surface casing which are shallow casing strings designed to protect the drilling equipment from the washout and further protect the shallow water zones. Finally, cementing process is utilized in liner casing which is a casing string cemented inside another intermediate casing string but does not extend the full length of the wellbore; it is "hung" at the bottom of a larger casing string and cemented in place.

Cementing is performed when the cement slurry is deployed into the well via pumps. The cement slurry displaces the drilling fluids remaining within the well, and replaces the fluids with cement. Preferably, such displacement should be performed in a continuous manner such that there is no interruption to the flow of cement. Such process requires a continuous delivery of a desired quality and quantity of cement slurry so that the first cement down the hole remains stable until last cement is placed after one continuous operation. Then, the cement must remain stable while it is static up and until the time it sets or hardens. This can take up to 4-6 hours to place cement and up to 12 hours for the cement to set uphole where the temperatures are cooler than the bottom of the well. The cement slurry flows to the bottom of the wellbore through the casing. From there, it fills in the annular space between the casing and the wellbore, and hardens or sets. The hardened cement creates a seal so that outside materials (including gases) cannot enter the well flow, as well as permanently positioning and protecting the casing in place.

Downhole cementing poses particular problems caused by changing temperatures and hydrostatic pressure along the cement column, thus making conventional cement preparation and composition practically unsuitable for a downhole cementing. Preparing slurry having the required physical and chemical properties is essential before commencing cementing operations in a wellbore environment. The goal is to manufacture highly homogeneous, stable, lightweight cement slurry. The proper cement mix is prepared to provide slurry having the required density and viscosity before the slurry is pumped into the hole. Special mixers, including hydraulic jet mixers, re-circulating mixers or batch mixers, are used to combine dry cement with water to create the wet cement or slurry. The cement used in the well cementing process is Portland cement, typically one of the API Classes of Portland cement each employed for different situations and it is typically prepared also with chemical additives to form the final slurry. Additives can include accelerators, which shorten the setting time required for the cement, as well as retarders, which do the opposite and make the cement setting time longer. In order to decrease or increase the density of the cement, lightweight and heavyweight additives are added. The former, for instance, include spheres, bubbles, lightweight minerals such as silica fume. However, the conventional additives used in a lightweight cementing (e.g. glass bubbles or ceramic spheres) are expensive per se, require special bulk mixing procedures to preserve compressive strength of the cement and can be hazardous to the people working closely with them. Additives can be added to transform the compressive strength of the cement, as well as flow properties and dehydration rates. Extenders can be used to expand the cement in an effort to reduce the cost of cementing, and antifoam additives can be added to prevent foaming during mixing and within the well. In order to plug lost circulation zones, bridging materials are added, as well. For setting wells at deep depths, under high temperature or pressure, as well as in corrosive environments, special cements and/or additives are utilized.

Depending upon the particular formation, bore depth, equipment and other factors, it may be necessary or desirable to mix additives with the cement to retard setting, accelerate setting time, control fluid loss in the cement, gel the cement and reduce or increase the slurry density. Additives may be used to increase the mechanical strength of the cement when set, reduce the effect of mud on the cement and to improve the cement bonding. Additives are typically mixed with the cement as the slurry is prepared and before the cement is pumped into the well. In some cases, there may be different pozzolanic materials combined with the cement itself but, as noted above, typically Portland cement is blended with additives and/or modified to accommodate wellbore conditions such as temperatures up to or greater than 600 degrees Fahrenheit. In different variations, binders other than Portland cement may be used, for example, fly ash and other pozzolanic materials.

The physical characteristics of Portland cement and similar binders may tend to create a drag effect, affecting the flow characteristics of the cement. In particular, Portland cement particles have a generally flat shape that creates a drag effect, reducing the flowability of the cement. Adding components such as fly ash in combination with Portland cement can alleviate some of this drag effect, but the addition of fly ash may create other issues such as variability in the heat of hydration of the cement and/or the set time of the cement. Variability in the physical and chemical properties of fly ash utilized as an additive in oilfield cement can also increase variability in the chemistry and physical properties of the slurry. Such variability may be small; however, in well cementing applications, the effect of such variability can be significant.

Water is of course, necessary to hydrate the Portland cement and provide appropriate flow properties. However, if excessive water is used, separation of the water from the cement mixture may occur, especially once the cement stops flowing. Excessive water may also cause loss of strength, excessive shrinkage and variability in hydraulic pressure, which may be detrimental in different applications. Fluid loss additives may be used to reduce a segregation and separation of wellbore cement components and compensate for water imbalance. Fluid loss additives are designed to keep the cement slurry more cohesive over a range of common variables and to mitigate the effect of excessive water in the slurry. However, the increased cohesiveness of the slurry tends to reduce the flow rate of the cement slurry into the bore. One way of improving the flow properties of the cement slurry and/or compensating for the effect of fluid loss products, is to entrain air (or other gas) into the slurry as or before the slurry is injected into the bore. Such air-entrained cement slurry creates a lightweight cement eliminating expensive lightweight admixes such as hollow ceramic or glass microspheres and the costly method of their entrainment.

Also, lightweight cementing with its particular type known also as "foamed cementing" or "cellular cementing" has been utilized in a wellbore cementing to reduce the density of the cement column thereby reducing the hydrostatic pressure of the cement slurry column on the rock formations. Simply, lightweight cements are desirable because they will exert less hydrostatic pressure on the rock formation. If the formation fractures during the cementing process, the cement will enter the formation and compromise the ability to place cement along the entire wellbore; this, ultimately, causes a poor or failed cementing of the wellbore. The light weight cement is of particular usefulness in weak formations, i.e. in formations having relatively low fracture gradient. Foamed cement has several advantages in addition to its low density. It has relatively high compressive strength (which is developed in a reasonable time), causes less damage to water-sensitive formations, can reduce the chance of annular gas flow, and allows cementing past zones experiencing total losses.

Conventional foamed cementing utilizes dispersed gas, usually nitrogen, in cement slurry which contains surfactant as a foaming agent and other chemical products to improve foam stability. The nitrogen is introduced under pressure in a closed system, creating an "energized fluid." The energized fluid causes several drawbacks in downhole cementing with the utilization of cellular cement. First, since compressed gases are used to produce foamed cement, additional safety precautions are required when performing foamed cement jobs. The gasified cement, as it flows to surface, expands and can produce great force. This can cause it to blow across the pit and erode the pit walls. Also, due to the compressed gases, the fluids have much more potential energy than conventional slurries. The energized fluid in the wellbore requires an additional amount of cement and extra procedural step called cap cement placed into the wellbore down the annulus after the foam cement has been pumped down the casing and up the annulus. The utilization of the cap cement is to add a second mechanism to withhold the pressure of the energized slurry along with a mechanical well control. The second function of the cap cement is to allow a certain amount of pressure to be applied to the annulus to ensure the correct amount of gas compression downhole and assure the proper density of the downhole slurry. The placing of the cap cement incrementally raises the costs of the entire operation. Furthermore, a conductor and surface casing cannot typically be cemented with an energized fluid because there is no well control at surface at this point (no BOP installed) which leaves the annulus open to the air and, therefore, there is no containment for an energized fluid, which will decompress causing a blowout of the well.

During the manufacturing of the foamed cement, conventional air entrainment techniques typically use surfactant formulations which are largely or totally anionic based compositions added to cement slurries. Methods using these compositions are practically unable to compensate for large changes in cement and/or pozzolanic chemistry, agitation conditions, slurry temperatures and other factors that change the characteristics of the slurry. Variations in these parameters limit the capability to predict or calculate slurry yield volume and/or the quality of the air entrainment in the slurry injected into the well. Unstable slurries result in a pore structure which is nonspherical and interconnected. This phenomenon occurs while the cement sets. It is caused by a rupture of unstable nitrogen bubble walls upon contact with other nitrogen bubbles, resulting in coalescence and larger gas pockets. This results in a sponge-like structure with lower compressive strength, higher permeability, and inferior bonding properties. This inability to control sources of variability and/or to compensate for the effects of these sources of variability limits the desirability of utilizing air entrainment (foamed gas) as a method of adjusting slurry parameters or limiting the amount of cement used in the slurry.

Due to a variable hydrostatic pressure and temperatures in a wellbore environment, there is a need to produce cement slurry of variable density to account for a changing hydrostatic pressure in a wellbore column. These real time adjustments in a density of the cement slurry pose a challenge which prior art has yet to solve, for it requires complex pumping schedule with close coordination and control of the treatment on location.

Accordingly, there is a need for safer and more cost-effective downhole cementing system and method that manufactures lightweight, cellular cement in a continuous process but does not use traditionally gasified cement slurry having much higher than desirable potential energy. There is also a need for producing stable and homogeneous cement slurry for a downhole cementing of a wellbore having physical and chemical characteristic which preserve compressive strength at high temperature. There is also further need for well cementing that increases productivity of the well by avoiding the downtime caused by a blow outs due to energized fluid columns, or by abandoning the well in case of a poor/inadequate cementing job. It is a further object of the invention to provide such a system which can be disassembled (has adequate portability) for carrying from place to place, and which can be assembled relatively easily on the site. Thus, there is a need for producing stable, cellular cement slurry with predictable chemical and physical characteristics which assures longevity and safer operation of a producing well.

SUMMARY OF THE INVENTION

Disclosed herein is the system and method for manufacturing stable and lightweight cement slurry for downhole cementing. In accordance with the invention, a composition including one or more foam stabilizing, non-ionic surfactants is used with the system to produce foamed gas that is continuously admixed with cement slurry for use in well completion operations. These foam stabilizing non-ionic surfactants are fluoropolymers such as described in U.S. Pat. No. 6,153,005 issued Nov. 28, 2000 to Welker et al. Other non-ionic surfactants, polymers, and bubble forming agents may also be used such as ToughAir® from Miracon, Inc., hereinafter, the "foaming agent" or "foam stabilizing non-ionic surfactant." The foaming agent having a stabilizing non-ionic surfactant utilized by the present invention's system and method is an aqueous-based air entrainment solution (hereinafter "polymer-based solution"), said polymer based solution being utilized in an aqueous-based air entrainment solution supply system.

It is an object of this invention to provide a cement composition having foam stabilizing non-ionic surfactants additives to achieve a set of rheological properties which makes it readily pumpable. The primary object of the present invention is the creation of a foamed gas of a density ranging from about 2.15 to about 2.35 lb/cubic ft. from the aqueous-based air-entrainment solution and compressed air. The foamed gas produced with non-ionic surfactants and fluoropolymers reduces the drag effect created by the flat particle shape of Portland cement, improving the flowability of the cement as it is pumped into a well bore. The bubble size of foamed gas produced with such non-ionic materials is also more consistent than the bubble size of foams produced with conventional anionic surfactants and requires less mechanical agitation to introduce air into the cement slurry. This allows the introduction of a greater volume (up to 80%) of air in the cement slurry and reduced shrinkage when the cement sets in a wellbore. Less shrinkage, in turn, reduces water bleed from the cement as the cement slurry sets and the formation of voids and channels in the set cement. This is important in oil well applications since the formation of bleed channels and voids can reduce the integrity of the seal formed by the cement between the well casing and the well bore.

It is a further object of the present invention to provide a method of continuous manufacturing of a stable cement slurry having "constant density" downhole by adding foamed gas in a variable volume to account for a changing hydrostatic pressure before the slurry is pumped downhole.

It is yet a further object of the present invention to provide an apparatus for the manufacturing of a foamed gas from the aqueous-based air-entrainment solution and compressed air.

In an exemplary embodiment a method for manufacturing stable cement slurry for a downhole cementing is disclosed herein. The method comprises the steps of manufacturing a foamed gas, comprising: moving an aqueous-based air-entrainment solution in an aqueous-based air entrainment solution supply system during the predetermined time, the aqueous-based air-entrainment solution supply system including: an aqueous-based air entrainment solution reservoir, an aqueous-based air entrainment solution moving conduit, an aqueous-based air entrainment solution supply pump that pumps aqueous-based air-entrainment solution from the aqueous-based air-entrainment solution reservoir through the conduit to a mixing chamber, a drive for driving the aqueous-based air-entrainment solution supply pump at a predetermined speed; adding compressed air, said compressed air pressure preset and regulated by an air pressure regulator; after the predetermined time, actuating a first and a second valves in the aqueous-based air-entrainment solution system and an air supply system, respectively, to divert the aqueous-based air-entrainment solution and the compressed air to a mixing chamber to produce a foamed gas; directing the foamed gas to a discharge line; using the foamed gas to make a cement slurry of varying density before it is pumped downhole; deploying the cement slurry of varying density into the wellbore to set as a cement column having a constant density; and repeating said manufacturing process of the cement slurry in a continues manner until the desired amount of cement slurry for the wellbore casing is satisfied.

In an exemplary embodiment a system for implementing the method is disclosed, the system comprising: an aqueous-based air entrainment solution supply system for providing an aqueous-based air entrainment solution for producing foamed gas, including: an aqueous-based air entrainment solution reservoir; an aqueous-based air-entrainment solution moving conduit, an aqueous-based air entrainment solution supply pump that pumps aqueous-based air-entrainment solution from the aqueous-based air-entrainment solution reservoir through the aqueous-based air-entrainment solution moving conduit to a mixing chamber, a manually operated drive (rheostatic control device) for driving the aqueous-based air-entrainment solution high resolution supply pump at the predetermined speed; a first check valve in the aqueous-based air-entrainment solution supply system, said first check valve actuated by a pressure of the aqueous-based air-entrainment solution of at least approximately 0.5 $lb/in^2$; a compressed air supply system for supplying compressed air for producing a formed gas, including: an air compressor, an air line, wherein said air line moves the compressed air under the control of a an air pressure regulator, said air pressure regulator manually set to a predetermined value; an air supply two-way valve for providing a consistent volume of air under the control of the air pressure regulator, said two-way valve controlled by relays (timers), said relays being capable of being manually set to open/close said two-way valve at the beginning and the end of the manufacturing of the foamed gas; a second check valve, said valve actuated by the pressure of the compressed air of at least approximately 0.5 $lb/in^2$; a mixing chamber, the mixing chamber receiving the aqueous-based air entrainment solution and the compressed air diverted by first and second check valves, respectively, and wherein the aqueous-based air-entrainment solution and compressed air are blended in the mixing chamber; wherein said mixing chamber comprises a stationary mixer, the stationary mixer receiving the aqueous-based air entrainment solution and compressed air and mixing the aqueous-based air-entrainment solution and the compressed air to produce the foamed gas; and a discharge line, for discharging the foamed gas for mixing with a base cement composition to produce stable foamed cement slurry connected to a pump for pumping the foamed cement slurry into an oil and/or gas well.

According to one embodiment of the present disclosure, the system may have a water supply having water supply reservoir, or the foaming agent may be already aqueous, the water reservoir made to hold and convey water to the mixer according to a pre-determined speed controlled by the second pump under a control of a second drive (rheostatic control device) set to the predetermined speed. The system may include at least one check valve to divert the water from the reservoir to the mixing chamber. The system described below assumes no separate process water supply system; rather, the system contemplates the water being already injected into the foam stabilizing non-ionic surfactant, producing an aqueous-based air entrainment solution such as ToughAir®.

The system further comprises an air pressure regulator for controlling air pressure in the air pressure system, wherein said air pressure regulator is manually set to add compressed air according to pre-determined fixed pressure value. The delivery pressure of a compressed air to the point where it meets the aqueous-based air entrainment solution is regulated so that the density of the end product (foamed gas) ranges from 2.15 to 2.35 lb/cubic ft.

The system has been further designed as to vary the rate of the flow of the foamed gas and thus allowing to increase or decrease the volume of an injected foamed gas while mixing with a base cement slurry having density ranging from about 1400 to about 1900 kg/m$^3$ and creating a variable density of the cements slurry to be deployed ranging from about 700 to about 1400 kg/m$^3$, which accounts for the change in a hydrostatic pressure downhole. As a result of these real-time adjustments to the volume of the foamed gas, a "constant density" of the cement column ranging from about 1000 to about 1700 kg/m$^3$ is created.

The system for preparing a stable, lightweight cement composition for downhole cementing includes a manually operated drive (rheostatic control device) for controlling speed of the pump regulating the flow of the aqueous-based air entrainment solution through at least one check valve. The manually operated drive (rheostatic control device) may be preprogrammed for continued production of the foamed gas further entrained in a base cement slurry and operable through a motor to regulate the speed of the high resolution pump. For example, the drive (rheostatic control device) is set to a pre-determined value of speed and may be operable to control a flow rate of the aqueous-based air entrainment solution through the solution conduit to the mixing chamber where air and the aqueous solution is mixed to produce foamed gas.

According to embodiments of the present disclosure, an electrical time delay relay is part of the system. The relay is utilized to insure that the compressed air meets the aqueous-based air entrained solution at the proper time or sequence after the predetermined time, during which a solution reaches a mixing point with an introduced air. In addition, said relay also signals the two-way valve to remain open as long as the process of delivering of the aqueous-based air entrained solution and subsequent mixing of said solution with the compressed air lasts.

Yet, according to another embodiment of the present disclosure, the present system is designed to continuously output the foamed gas that can be intermixed with the cement slurry. This continued flow warrants a constant flow of the cement slurry downhole to effectively displace the drilling mud from the well. By continuous, it is meant that the system of the present disclosure is designed to continuously deliver homogenized cement slurry to a well until a desired amount of the homogenized slurry has been pumped in the wellbore. It is undesirable to pause while producing batches of cement, as the time is not working for but against the cement slurry changing its chemical and physical properties. This continuous delivery is accomplished by carefully engineering a design parameters of the foamed gas entrained into the base cement slurry.

Although the process of manufacturing of a foamed gas is a continuous process, the method and apparatus is designed to variably change (by manually changing the input such as time, units of volume to be processed) the various parameters of the manufacturing process such as mixing speed, mixing rate and pressure of the added air thus changing parameters in real time and without interruption to the overall manufacturing process. Due to a variable hydrostatic pressure and temperatures in a wellbore environment, there is a need to produce cement slurry of variable density to account for a changing hydrostatic pressure in a wellbore column. The system is designed to allow manufacturing of a different density of the cement slurry ranging from about 700-1400 kg/m$^3$ (by adding different volume of the foamed gas) depending on the depth of the well and desirable compressibility dictated by the hydrostatic pressure of the well. This may be accomplished by first controlling a density of the base cement slurry, ranging from about 1400-1900 kg/m$^3$, including controlling (and testing) the amount of water and chemical additives that dictate density, viscosity, set time and compressive strength of the base cement slurry as it is almost impossible to change the base slurry density over the course of the job as this would shift the downhole performance. Then, by increasing or decreasing the volume of a foamed gas having desired density ranging from about 2.15 to about 2.35 lb/cubic ft. being introduced to the base cement slurry, changing the overall density of the slurry mixture to ultimately achieve the constant density of the cemented wellbore ranging from about 1000 to about 1700 kg/m$^3$. It is also important to note that the overall cementing job is designed to decrease the overall density of the cement slurry as the slurry is continuously pumped to the well in order to compensate for the increasing pressure downhole (the most dense slurry first, the least dense slurry last). The embodiments of the present disclosure allow engineering a cement job whereby the entire cement column of the wellbore reaches constant density.

Various configurations of the system may be employed, wherein portions of the system may be replicated in order to achieve reliability in the case of equipment malfunction, or in order to increase production rates or volumes of foam made.

The system described herein is portable and could be easily transported to the oil field site, assembled and disassembled, if needed such that foamed gas may be mixed with cement used at the work site.

U.S. Patent Publication No. 2010/0246312, to Welker, U.S. patent application Ser. No. 12/748,883 (the '883 application), filed Mar. 29, 2010, describes a system, method and apparatus for entraining air in concrete. The apparatus systems and methods described in the '883 application may be used with non-ionic surfactants, polymers, and foaming agents to produce foams and concrete slurries containing entrained air for use in oil and gas well applications. Other systems and methods described herein for producing such foams and slurries may also be employed, depending upon the particular application.

Although the present disclosure has been developed to improve safety and effectiveness in an oil and gas wells, including conductor casing, surface casing, intermediate and production casing, liner casing, lost circulation and abandonment plugs, pipe line abandonments, it may also find application in a programs for mine remediation and soil stabilization when an air entrained stable cement slurry is needed having certain physical and chemical characteristics.

The principals of the invention will be further discussed with reference to the drawing(s) wherein a preferred embodiment is shown. The specifics illustrated in the drawings are intended to exemplify, rather than limit aspects of the invention as defined in the claims.

BRIEF DESCRIPTION OF THE DRAWINGS

For a more complete understanding, reference is now made to the following description taken in conjunction with the accompanying drawings in which.

DETAILED DESCRIPTION

Referring now to the drawings, wherein like reference numbers are used herein to designate like elements throughout, the various views and embodiments of a system, method and apparatus for producing stable, lightweight cement slurry for downhole injection are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
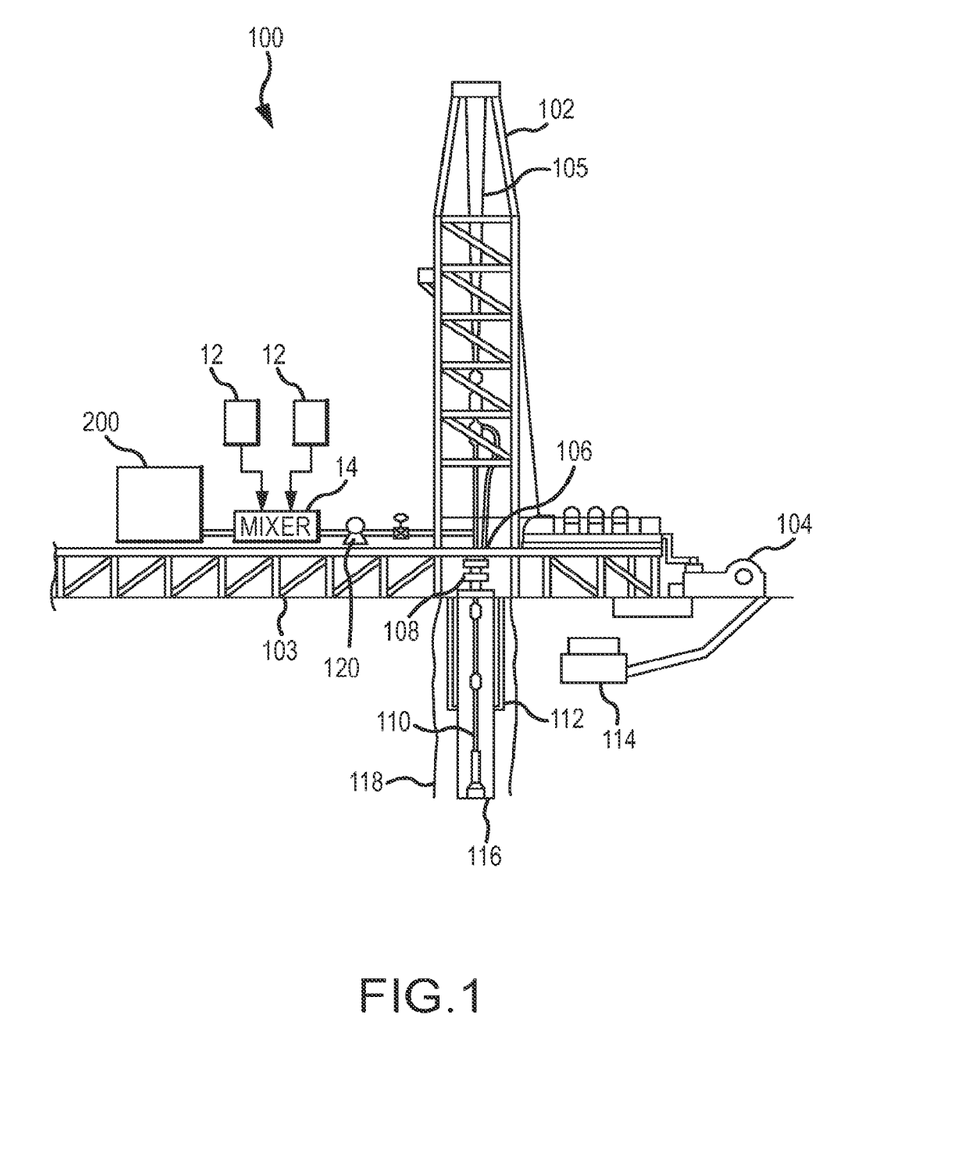
FIG. 1 is a schematic representation of a drilling apparatus wherein a system is utilized to produce a stable and homogeneous, lightweight cement slurry utilizing a foamed gas for air entrainment in casing a wellbore.

Referring now to FIG. 1, there is depicted a typical drilling apparatus 100 used in oilfield production. The apparatus normally includes a derrick 102 extending above a drilling platform 103. The derrick provides a means of rising and lowering drill casing and a drill pipe as the wellbore is formed. As illustrated, apparatus 100 includes a turntable 106 that is powered by one or more engines 104. Turntable 106 is used to rotate a drill string 110 that extends downward through a drill casing 112. Drill string 110 includes a drill bit 116 mounted on the lower end of the drill string which is used to form the wellbore. A hoist mechanism 105 is used to raise and lower drill string 110 during the drilling operation such that additional lengths of drill pipe may be added to the drill string as the bore is formed. A blow-up preventer 108 may be utilized to relieve pressure spikes that may occur during the drilling operation.

As illustrated, drilling apparatus 100 includes a foamed gas manufacturing system 200 that may be used to produce a foamed gas being further injected into a base cement slurry for cementing casing 112 in the wellbore. System 200 uses an aqueous-based air entrainment solution system to produce a foamed gas that is continuously added to the cement slurry in order to manufacture a stable and homogeneous, lightweight cement composition for a downhole cementing. The dry cement powder is typically transported to the drill site preblended in transport trucks. The cement is often blended at an offsite blending facility using pneumatic mixing. The cement can be stored on location either in the transport trucks (not shown) or in storage silos, bins or other pressurized vessels 12 as illustrated in FIG. 1. The cement is moved by air pressure to move it from one vessel to another or to the mixing equipment 14. The chemical additives can be added to the cement at the blending facility in what is known as preblended or drymixed or they can be added to the mix water before the water is mixed with the cement powder.

After casing or steel pipe is run into the well, an L-shaped cementing head is fixed to the top of the wellhead to receive the slurry from the pumps. Typically, two wiper plugs, or cementing plugs are used to sweep the inside of the casing and prevent the slurry from mixing with the drilling fluids. To keep the drilling fluids from mixing with the cement slurry, a bottom plug is introduced into the well and cement slurry is pumped into the well behind the plug. The bottom plug is then secured adjacent the bottom of the wellbore with a float collar, which functions as a one-way valve allowing the cement slurry to enter the well. The pressure of the cement slurry pumped into the well is increased until a diaphragm within the bottom plug is broken, permitting the slurry to flow through the plug and up into the annular passage between the casing string and the wellbore. After the required volume of cement is pumped into the well, a top plug is pumped into the casing, pushing the remaining slurry through the bottom plug. Once the top plug reaches the bottom plug, the slurry pumps are turned off, and the cement is allowed to set in place. The amount of time required for the cement to harden is called thickening time or pumpability time. For setting wells at deep depths, under high temperature or pressure, as well as in corrosive environments, special cements and/or additives are utilized.

Foams are characterized by their "quality," which is the ratio (expressed as a percentage) between the volume occupied by the gas and the total volume of the slurry. It is desired that the quality of the cement be essentially same from the top of the cement to the bottom of the cement column. Typically, the quality of foam will decrease when flowing down the casing where pressure may exceed 10,000 psi. The quality will then increase again when the foam flows up the annulus. Because of changing pressure of the wellbore, the volume ratio of the foamed gas changes, which results in changes in density, hydrostatic pressure, rheological parameters, flow rates, etc. Thus, the amount of foamed gas injected into the base cement slurry will increase from leading slurry to trailing slurry. To obtain an engineering design of the foamed cement portion of the column such that a "constant density" of the cement column (cement column has the same properties throughout the cemented interval), is created, one must determine the amount of the foamed gas which must be injected to the base cement slurry at various times throughout the job. This number is expressed by the foamed gas ratio, which represents the amount of foamed gas in standard cubic feet per barrel of base slurry. The amount of foamed gas that must be injected and the rate of increase can be computed utilizing computer models. The amount of foamed gas rate may also be calculated by using a fixed pressure gradient designated Px. Px can be computed as Px=x*pgrad+C, where C is typically small number equivalent to the value of squeeze pressure on top of the cement, x is the depth to the point of interest, and pgrad is the pressure gradient of the slurry gas mixture. The methods discussed above, are only exemplary methods, and not intended to be exclusive. They are shown here to demonstrate two conventional approaches that may be elected by a job designer.

Water is added to the mixing equipment 14 to produce the cement slurry that is injected into the annular space between the drill casing 112 and a wellbore 118 (FIG. 1). In one embodiment, the slurry may be produced in a continuous process and pumped with pump 120 into the wellbore 118 as described above (FIG. 1). In another variation, the slurry may be produced in a batch operation and stored in an agitated holding tank (not shown) and pumped into a wellbore on as needed basis. In either variation, system 200 (as described below) is used to produce a foamed gas that is admixed with the slurry in mixer 14. As described in detail below, cement slurry including the required components, additives and a consistent density of a foamed gas is produced. It will be appreciated that the cement slurry produced in this fashion will minimize shrinkage and water bleed that may occur as the slurry sets in position in the bore. This in turn will prevent or minimize the formation of void spaces or channels between the casing and the wellbore thereby preventing or reducing gas leakage between the casing and the bore after the slurry has set in position.

Figure 2:
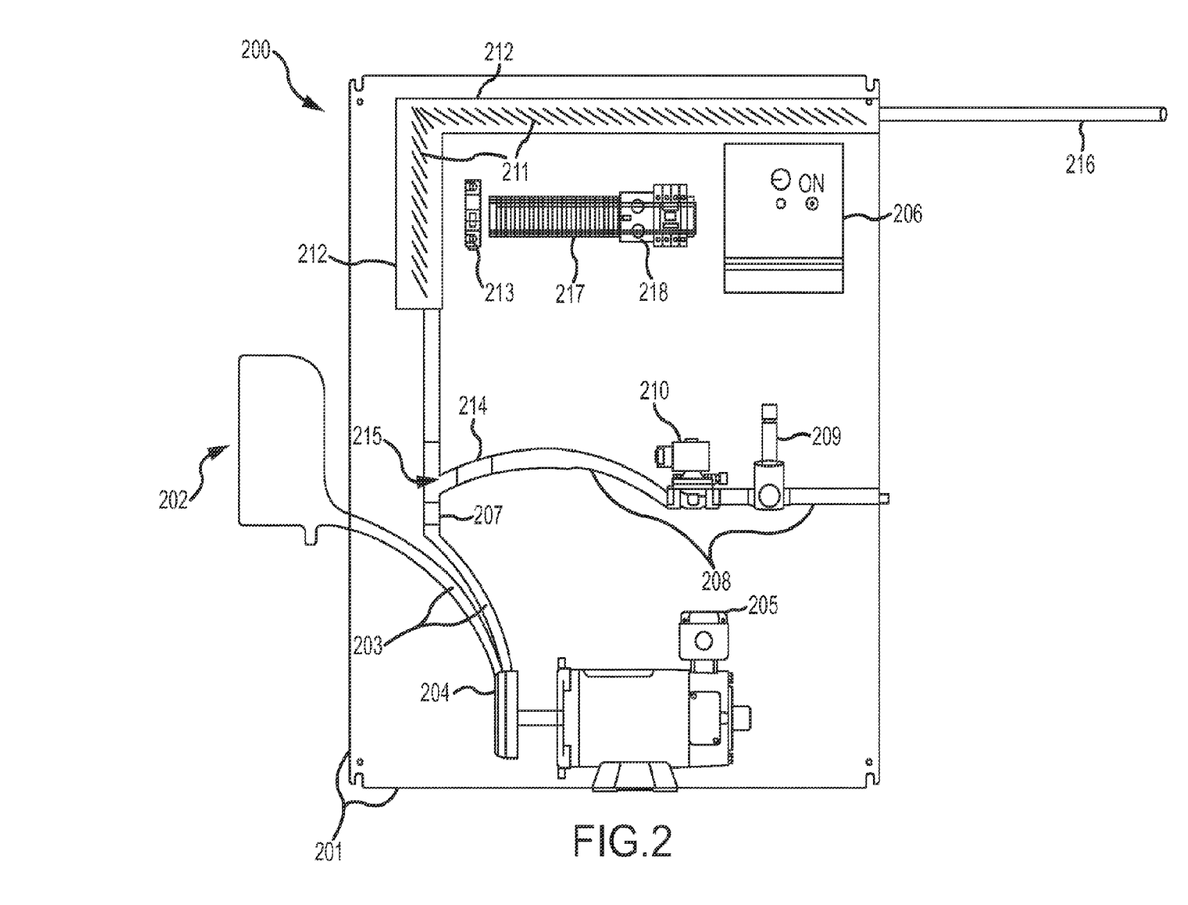
FIG. 2 is a diagrammatic representation of one variation of the system for producing a foamed gas for air entrainment in casing a wellbore.

In one embodiment, an exemplary system 200 is used in conjunction with the drilling apparatus 100 to produce stable, lightweight cement composition with foamed gas. As used herein, a cement composition includes batched cement dry materials or wet batched cement materials. System 200 uses compressed air (although it is designed to use any other type of gas, including nitrogen), an aqueous-based air entrainment solution to provide a polymer-based solution foam (foamed gas) that is added in predetermined amounts to cement in order to entrain air in the cement. Suitable polymer-based solution compositions for producing air-entraining foams are disclosed in U.S. Pat. No. 6,153,005 issued Nov. 28, 2000, to Welker, et al., the disclosure of which is incorporated herein by reference for all purposes. Other non-ionic surfactants, polymers, and bubble forming agents may also be used such as ToughAir® from Miracon, Inc.

It should be understood that, from the standpoint of an overall processing system for receiving an input product, mixing that product and providing the output product with the above-disclosed system is a continuous process until a required amount of the cementitious slurry is made for the wellbore cementing. In order to ensure the consistency of such a process, it is important to visually observe the consistency of the foamed gas being discharged and, if needed adjust the parameters of the mixing constituents to ensure that all of the constituents that are placed into the system are in such a state that they will mix correctly.

According to one embodiment of the present disclosure, a pressure-measuring device may be utilized to monitor the pressure of the out coming foamed gas being discharge through a discharged line. The desired value of such foamed gas' pressure ranges from about 32 psi to about 35 psi. It is necessary for the foam to be correctly mixed by the system 200 for the given well. The reason that this presents an issue is that the foam requires multiple constituents and chemicals to be mixed in a very precise manner to achieve the correct consistency of the foamed gas. It is desirable that the system starts up and produces the correct consistency, etc., for the mixture at the beginning of the start of the pre-programmed run and at the end thereof. However, according to embodiments of the present disclosure, the system is designed for continuous running and production of the foamed gas until the desired amount of the cement slurry for casing a wellbore has been satisfied. Therefore, the embodiments of the present disclosure contemplate possible recalibration of various parameters such as mixing rate, speed of flow of individual constituents (e.g., solution and compressed air), etc. after analyzing the output product (foamed gas) and the various set points of all of the sub-processes that are employed in the overall process. It is therefore possible to provide feedback in realtime according to embodiments of the present invention. By analyzing the properties of the resulting product, the operator then makes a determination as to what change must be made in order to correct for some deviation of the output product from a desired range.

FIG. 2 is a schematic representation of one variation of a system 200 for producing a polymer-based solution foam, also referred to as an air-entrained foam or foamed gas, to entrain air into a base cement slurry.

Depending on the application, a diluted or concentrated aqueous-based air entrainment solution for use in system 200 may be stored in an aqueous-based air entrainment solution reservoir 202. In one embodiment, the aqueous-based air entrainment solution from reservoir 202 is pumped upstream through a solution conduit 203 using a high-resolution aqueous-based air entrainment solution pump 204, said pump 204 powered by a motor 205, said motor driven by a driver 206, said driver manually set to a predetermined speed value. The aqueous-based air entrainment solution reservoir 202 is part of an aqueous-based air entrainment solution supply system used to supply aqueous-based air entrainment solution to a mixing chamber 212.

From reservoir 202, which is maintained in close proximity to the system 200, the aqueous-based solution is gravity-fed through the solution conduit 203 to the high resolution aqueous-based solution supply pump 204. The supply pump 204 is typically Berns 74 GPH pump (a vane-type positive displacement pump) powered by a variable speed drive 206. Pumps can vary in size to provide a minimum and maximum flow rate (per milliseconds). A rheostat (drive) 206 is used to control the rpm of the motor 205 that turns the pump 204. The rheostat's setting (for a specific size motor and pump) determines the exact/repeatable output rate for the high resolution aqueous-based air entrainment solution pump 204. The operator manually programs the speed of variable speed drive 206 thereby the flow of polymer-based solution based on a preprogrammed set point is achieved. The polymer-based solution then flows through a first check solution supply valve 207.

In one variation, system 200 utilizes an air compressor (not shown) for providing compressed air to produce the foamed gas. Compressed air from air compressor is directed through air line 208. Compressed air from air line 208 is directed to an air pressure regulator 209, which is manually preset to a desired value. Air pressure regulator 209 controls the pressure of the air introduced through the air line and mixed with the aqueous-based air entrainment solution to produce foamed gas. Pressure regulated air from regulator 209 is directed through a two-way valve 210 that operates under the control of relays (timers, FIG. 5), which are manually set to delay the opening of the two-way valve until the aqueous-based air entrainment solution reaches the mixing point 215 as well as delays the closing of the two-way valve after the manufacturing process is complete to completely purge the remaining air from the air system. In one embodiment, valve 210 is a solenoid-type two-way valve that is either in the open or closed position, depending upon whether foamed gas is being produced at that point in time.

After pre-determined time, the polymer-based solution is directed to a mixing point 215 after which air is injected into the aqueous-based solution stream at the mixing point 215. The aqueous-based solution and air mixture is then directed into a mixing chamber 212, said mixing chamber having a stationary mixer 211 to produce the foamed gas. In one embodiment, stationary mixer 211 is packed with a stainless steel or mesh or similar mesh to ensure adequate mixing of the aqueous-based air entrainment solution and air. An improved mixing chamber is disclosed in the U.S. Provisional Application Ser. No. 61/749,679 titled: Improved Mixing Chamber and Method Using Same filed on Jan. 7, 2013 by Charles D. Welker. It will be appreciated that one or more additional stationary mixers may be used downstream of stationary mixer 212 to further condition the mixture to provide the desired bubble size and consistency of foamed gas.

According to one embodiment of the present disclosure, a resting pressure of approximately 75 psi to about 80 psi of a compressed air introduced to the system is manually set on the air pressure regulator. When the mixture of solution and the compressed air enters the mixing chamber, a backpressure develops causing the pressure of the mixture to drop to approximately 35 psi. The backpressure allows the solution and the gas to uniformly combine. This drop in pressure prevents creating fluids having much more potential energy than desired.

If, during a mixing of a foamed gas with the cement slurry in a continued feed, there is a need to change the continued feed rate due to the changing of the cement slurry feed (e.g., when the process requires that the feed rate triples), various parameters of the process in system 200 could be adjusted. For instance, the first set of parameters achieved by: ½ HP motor, 74 GPH pump, a rheostat running at 63%, a mixing chamber of the size ¾" I.D. and 30" total length, and the 74 psi air pressure may be switched to: ⅔ HP motor, 317 GPH pump, a rheostat operating at 34%, a mixing chamber of size 1.25" I.D. and 24" total length, and 71 psi air pressure. As an example, according to one embodiment of the present disclosure, to achieve manufacturing of the foamed gas of a density ranging from about 2.15 to about 2.35 lb/cubic ft. at the rate of 2.2 cubic foot per minute, a compressed air is introduced at the resting pressure of approximately 75 psi and the aqueous-base air-entrainment solution is pumped through the solution system by the 74 GPH high resolution pump, which runs at approximately 63% capacity.

According to embodiments of the present disclosure, the components of system 200, (with the exception of air compressor, reservoir 202 and water supply, if present) may be housed in a single cabinet 201 that may be transported by, for example, a flat bed truck. This configuration permits the system to be deployed rapidly and conveniently and/or moved from one location to another as needed. In this embodiment, the physical sub-processes, i.e., the water supply (if present), the aqueous-based solution supply system and the compressed air supply system (with an air pressure regulator 209) are in close physical proximity (closely coupled) such that no long pipe or tubing runs are required to connect the sub-processes in the system.

In different embodiments, the components of system 200 may be transported to the drill site by means of a flatbed trailer that is positioned adjacent to drilling apparatus 100 (FIG. 1) and left onsite during well completion. In other variations, system 200 may be mounted directly on platform 103 and transported from drill site to drill site with drilling apparatus 100. It will also be appreciated that the use of system 200 may allow for the use of fly ash in the base slurry thereby producing a slurry with more desirable flow properties. System 200 may also be used to reduce the amount of Portland cement used in the base slurry insofar as slurry having more consistent chemical and physical properties may be produced, especially in the case wherein fly ash is used as a component of the base slurry.

According to embodiments of the present disclosure, values of the speed drive manually entered may be further manually adjusted to increase or decrease the speed of aqueous-based solution supply pump 204 to produce variable volumes (amounts) of foamed gas of constant density ranging from about 2.15 to about 2.35 lb/cubic ft. and to account for the changes in hydrostatic pressure downhole. When the pressured solution and/or compressed air reach at least 0.5 lb/int, the first check solution supply valve 207 and second check air valve 214, respectively open to allow further flow of the said solution and said air, respectively to the mixing point 215. As previously noted, the first check solution supply valve 207 may be positioned in a closed position, if the pressure of the solution has not reached at least approximately 0.5 lb/in$^2$, or may be opened to direct the solution to mixing point 215 where the aqueous-based solution mixes with compressed air. The foamed gas is discharged through a discharge line 216 at the desired pressure ranging from about 32 psi to about 35 psi.

Figure 3:
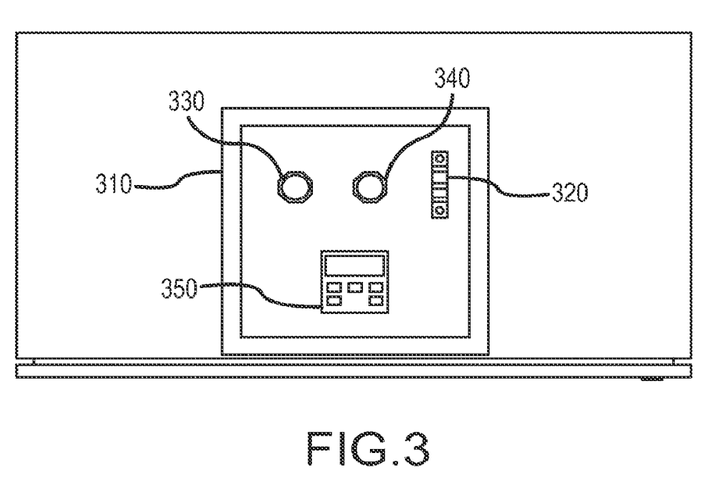
FIG. 3 is a top view of the exemplary apparatus according to embodiments of the present disclosure.

FIG. 3 is a top view of the exemplary apparatus according to embodiments of the present disclosure. It depicts the operator interface control which may be encased in a protective box 310 and includes: main power switch 320, start 330 and stop 340 buttons. Time designed for processing (if other than in continuous processing) or units of volume to be processed and delivered are manually entered by an operator using control pad 350.

Figure 4:
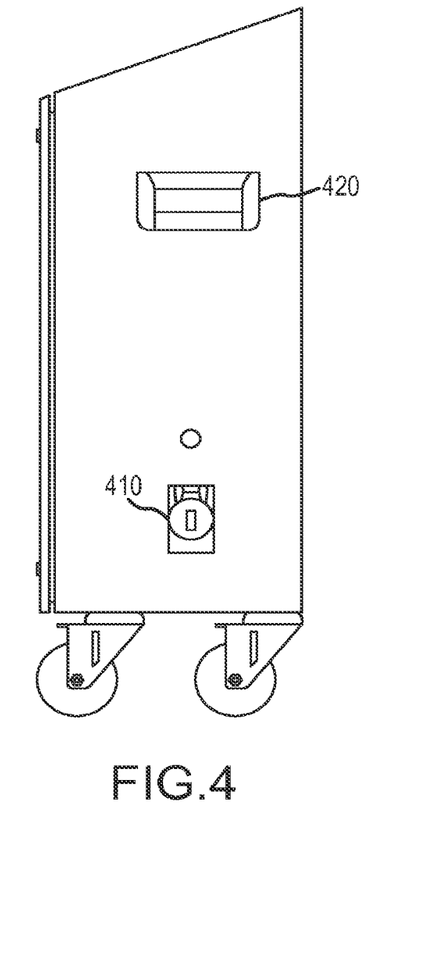
FIG. 4 is a right side view (lateral) of the exemplary apparatus according to embodiments of the present disclosure.

FIG. 4 depicts a lateral view of the exemplary apparatus according to embodiments of the present disclosure. The apparatus is powered electrically through a power input 410. The electrical power is distributed to the components of the apparatus by a wiring harness 217 (FIG. 2). Surges or spikes in electrical current supplied to the machine are eliminated by breaker or fuse 213 (FIG. 2). The apparatus may utilize handles 420 or lifting levers (not shown) to make the apparatus mobile.

Figure 5:
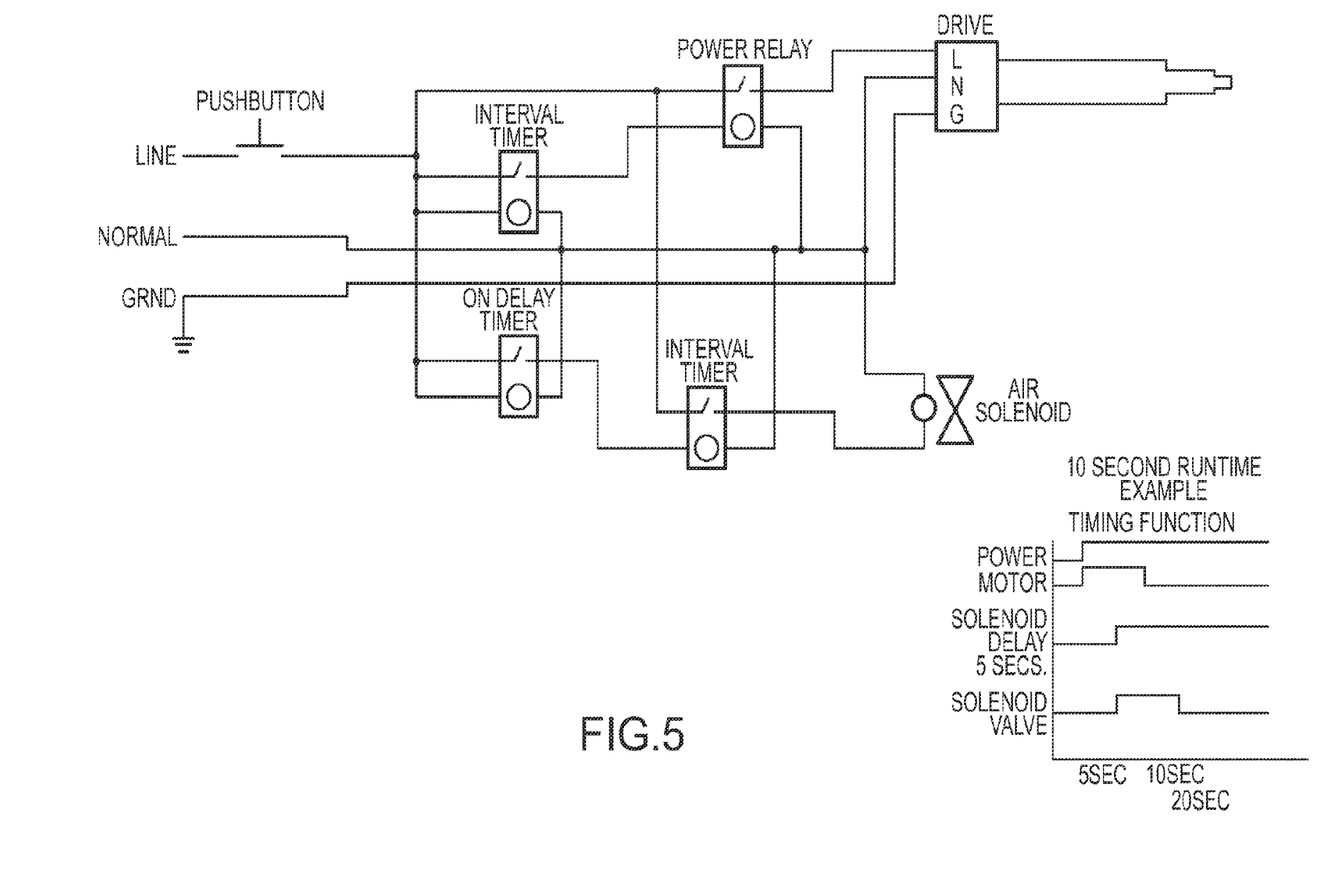
FIG. 5 is a simplified schematic of a relay diagram for the exemplary apparatus according to embodiments of the present disclosure.

In FIG. 5, a schematic circuit of time delay relay made up of a simple adjustable timer circuit is disclosed. An electrical relay 218 is part of the system 200. The relay is utilized to insure that the compressed air meets the solution at the proper time or sequence. The relay further signals a two-way valve 210 to remain open long enough for the air to mix with the solution and to deliver the solution to and through the mixing chamber.

Figure 6:
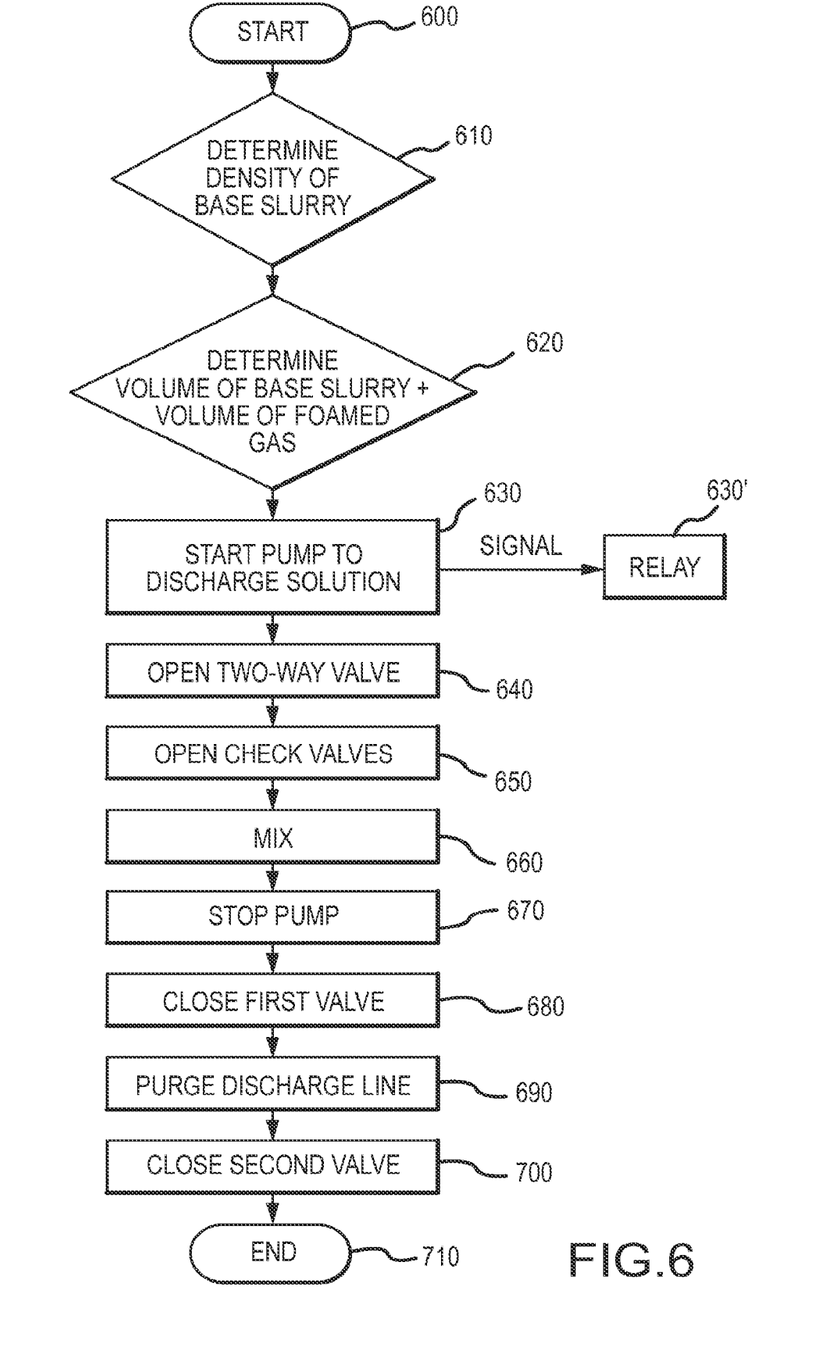
FIG. 6 is a flow chart illustrating an exemplary process using the system of FIGS. 1, 2 and 5 to provide stable and homogenous cement slurry utilizing foamed gas for air entrainment in casing a wellbore.

FIG. 6 is a flow chart illustrating an exemplary process using system 200 of FIGS. 1, 2 and 5 to provide a stable and homogenous, lightweight cement slurry utilizing foamed gas for air entrainment in casing a wellbore. The process begins at step 600. First, the desired density of the base cement slurry required for the job is established at 610 by calculating total annulus volume. This is done by measuring the diameter of the borehole along its depth, using a caliper log. Utilizing both mechanical and sonic means, multifinger caliper logs may be used to measure the diameter of the well at numerous locations simultaneously in order to accommodate for irregularities in the wellbore diameter and determine the volume of the open hole. Utilizing computer models, from the desired density of the base cement slurry and the expected hydrostatic pressure downhole, the volume of the base slurry necessary for the job as well as the volume of the foamed gas is calculated at step 620. Normally, the desired volume of the foamed gas will be expressed in cubic feet of foamed gas per barrel of slurry or in terms of a percentage on a volume basis.

In a preprogrammed speed, the drive 206 will proceed to start the aqueous-based air-entrainment supply high resolution pump at step 630. In one embodiment, manually set speed drive 206 initiates the start discharge command after a predetermined or preprogrammed time period, for example from about 30 seconds to about 2 minutes, beginning when the polymer-based solution supply pumps are started. The delay between the opening the two-way valve (air supply) and starting the supply pumps and the start discharge command permits regulation of the air pressure by the manually set regulator to achieve desired parameters of the static air pressure set at approximately 75 psi and, further, (if necessary) to make any adjustments to the polymer-based solution or process flow rates necessary to achieve the flows at the desired levels. When the start pump is initiated, a signal transmitted to relay 218 is dispatched to delay opening of the two-way valve at 630'.

At step 640, two-way valve 210 (FIG. 2) corresponding to the compressed air feed is opened to the discharge position. When the pressure of the solution in a solution conduit and the air in the air line reaches approximately 0.5 lb/in$^2$, respectively for each valve, the first and the second valve opens at step 650 to allow the flow of the solution and the air, respectively to meet at the mixing point 215. Polymer-based solution and the compressed air are mixed in the mixing chamber 212 at step 660.

After system 200 has operated continuously to produce the desired amount of foamed gas, the aqueous-based solution pumps will be stopped at step 670. Polymer-based solution supply valve 207 will be closed at step 680. At step 690, air supply two-way valve 210 (FIG. 2) will be opened to provide time sufficient for compressed air to purge discharge line 216 of any foamed gas remaining in the line. At step 700 the second check valve closes. At step 710, the process is ended with a delayed closing of the two-way valve and system 200 is reset to prepare the next cementing job.

It will be appreciated by those skilled in the art having the benefit of this disclosure that this system, method and apparatus for manufacturing stable and homogeneous cement slurry for wellbore cementing provides a means of entraining a controlled amount of foamed gas in a continuous mixing with a cement slurry. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for manufacturing stable cement slurry for downhole injection, which comprises the steps of manufacturing a foamed gas, comprising:
   moving an aqueous-based air-entrainment solution in an aqueous-based air-entrainment solution supply system during the predetermined time, wherein the aqueous-based air-entrainment solution is preformed, the aqueous-based air-entrainment solution supply system including:
   an aqueous-based air entrainment solution reservoir, an aqueous-based air entrainment solution moving conduit, an aqueous-based air entrainment solution supply pump that pumps aqueous-based air-entrainment solution from the aqueous-based air-entrainment solution reservoir through the conduit to a mixing chamber, a drive for driving the aqueous-based air-entrainment solution supply pump at a predetermined speed;
   adding compressed air, said compressed air pressure preset and regulated by an air pressure regulator;
   after the predetermined time, actuating a first and a second valves in the aqueous-based air-entrainment solution system and an air supply system, respectively, to divert the aqueous based air-entrainment solution and the compressed air to the mixing chamber to produce a foamed gas;
   directing the foamed gas to a discharge line;
   using the foamed gas to make a cement slurry of varying density before it is pumped downhole;
   deploying the cement slurry of varying density into the wellbore to set as a cement column having a constant density; and
   continuously repeating said manufacturing of the cement slurry until a desired amount of cement slurry for a wellbore casing is satisfied.

2. The method of claim 1, further comprising monitoring pressure in the discharge line with a pressure sensing device, wherein if the pressure in the discharge line varies from a predetermined value ranging from about 32 psi to about 35 psi, adjusting a preprogrammed set of parameters.

3. The method of claim 1, further comprising delaying an opening of a two-way valve by a predetermined time, said two-way valve controlling a flow of the compressed air to the mixing chamber.

4. The method of claim 1 further comprising using a pulse of compressed air to clear the discharge line after a predetermined volume of foamed gas has been discharged.

5. The method of claim 1, wherein the foamed gas has density from about 2.15 to about 2.35 lb/cubic ft.

6. The method of claim 1, wherein the foamed gas mixed with a base cement slurry, said base cement slurry having density from about 1400 to about 1900 kg/m$^3$.

7. The method of claim 6, further comprising the step of varying the rate of foamed gas introduced to the base cement slurry in a continuous manner.

8. The method of claim 7, wherein a density of the cement slurry before a downhole deployment ranges from about 700 to about 1400 kg/m$^3$.

9. The method of claim 1, wherein a hardened cement column has the constant density throughout said column ranging from about 1000 to about 1700 kg/m$^3$.

10. The method of claim 1, wherein the desired quality of a foamed cement in the cement column is approximately 40%.

11. The method of claim 1, wherein the rate at which the foamed gas is injected to the base cement slurry is increased from the leading cement slurry to the trailing edge of the cement slurry.

12. The method of claim 1, wherein the foamed gas comprises a non-ionic surfactant.

13. The method of claim 1, wherein the foamed gas comprises a fluorinated polymer.

14. A cemented wellbore, which comprises:
   a cement column having a constant density, further comprising a foamed gas produced according to the method of claim 1.

15. The cemented wellbore of claim 14, wherein said foamed gas is present in said cemented wellbore in an amount sufficient to form said cemented wellbore of a constant density in a range from about 1000 to about 1700 kg/m$^3$.

* * * * *